United States Patent
Shaffer et al.

(10) Patent No.: US 11,747,047 B2
(45) Date of Patent: *Sep. 5, 2023

(54) HOT WATER TANK WITH THERMAL MIXING VALVE

(71) Applicant: NATIONAL MACHINE GROUP, Stow, OH (US)

(72) Inventors: Ronald Shaffer, Stow, OH (US); Samuel Chrisant, Stow, OH (US); Robert William Hyde, Wadsworth, OH (US); Ronnie Browne, Stow, OH (US)

(73) Assignee: NATIONAL MACHINE GROUP, Stow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,880

(22) Filed: Feb. 21, 2022

(65) Prior Publication Data

US 2022/0235968 A1    Jul. 28, 2022

Related U.S. Application Data

(63) Continuation of application No. 16/345,139, filed as application No. PCT/US2017/058499 on Oct. 26, 2017, now Pat. No. 11,293,668.

(Continued)

(51) Int. Cl.
*F24H 9/20* (2022.01)
*F28D 20/00* (2006.01)
(Continued)

(52) U.S. Cl.
CPC ........... *F24H 9/2021* (2013.01); *F24H 1/122* (2013.01); *F28D 20/0039* (2013.01);
(Continued)

(58) Field of Classification Search
CPC .................................................. F24H 9/2021
See application file for complete search history.

(56) References Cited

U.S. PATENT DOCUMENTS 3,447,560 A * 6/1969 Dodson ................... F24H 1/202
126/362.1
4,210,125 A   7/1980 Fender
4,305,547 A * 12/1981 Cohen ................... F24H 9/2007
122/15.1

(Continued)

FOREIGN PATENT DOCUMENTS

CN   102022831 A   4/2016
JP    4877580 A   10/2007

OTHER PUBLICATIONS

International Search Report and Written Opinion of the International Searching Authority, dated Jan. 5, 2018, in related International application PCT/US2017/058499, International filing date Oct. 26, 2017; Applicant, National Machine Group; Forms PCT/ISA/220, PCT/ISA/210 and PCT/ISA/237; 19 pages.

*Primary Examiner* — Nathaniel Herzfeld
(74) *Attorney, Agent, or Firm* — Vorys, Sater, Seymour and Pease LLP; Mark A. Watkins

(57) ABSTRACT

A water heater system includes a water heater and a thermal mixing valve. The water heater includes a tank and a cap that each define interior volumes. The interior volume of the tank includes a heating element is the location where fluid is heated, whereas the cap includes a volume within which the thermal mixing valve may be disposed. The thermal mixing valve pulls cool and warm water from the volume of the tank, and then discharges a mixed stream of fluid at a user desired temperature via an outlet.

17 Claims, 12 Drawing Sheets

Related U.S. Application Data

(60) Provisional application No. 62/413,132, filed on Oct. 26, 2016.

(51) Int. Cl.
  *G05D 23/185* (2006.01)
  *F24H 1/12* (2022.01)
  *G05D 23/13* (2006.01)

(52) U.S. Cl.
  CPC ..... *G05D 23/1346* (2013.01); *G05D 23/1858* (2013.01); *F28D 2020/0069* (2013.01); *Y02E 60/14* (2013.01)

(56) References Cited

U.S. PATENT DOCUMENTS

| | | | |
|---|---|---|---|
| 4,680,446 A | 7/1987 | Post | |
| 5,347,956 A * | 9/1994 | Hughes | F24H 9/133 236/12.21 |
| 5,544,645 A | 8/1996 | Armijo et al. | |
| 5,647,269 A | 9/1997 | Miller et al. | |
| 6,041,742 A * | 3/2000 | Drake | F24D 3/1016 126/344 |
| 6,286,464 B1 | 9/2001 | Abraham et al. | |
| 9,268,342 B2 | 2/2016 | Beyerle et al. | |
| 10,837,676 B2 * | 11/2020 | Boros | F24H 1/181 |
| 2002/0066419 A1 | 6/2002 | Bradenbaugh | |
| 2010/0314457 A1 | 12/2010 | Todaka et al. | |
| 2012/0024968 A1 * | 2/2012 | Beyerle | G05D 23/1346 236/12.11 |
| 2012/0037095 A1 | 2/2012 | DuPlessis | |
| 2015/0013622 A1 | 1/2015 | Farris et al. | |
| 2015/0346740 A1 | 12/2015 | Whitehouse et al. | |
| 2016/0266588 A1 | 9/2016 | Ward et al. | |
| 2016/0348952 A1 | 12/2016 | Ward et al. | |

\* cited by examiner

HOT WATER TANK WITH THERMAL MIXING VALVE

CROSS-REFERENCE TO RELATED APPLICATIONS

This Patent Application claims priority to and the benefit of U.S. National Stage patent application Ser. No. 16/345,139 filed on Apr. 25, 2019, International Patent Application No. PCT/US2017/058499 having an International filing date of Oct. 26, 2017, and U.S. Provisional Patent Application Ser. No. 62/413,132 filed on Oct. 26, 2016, which are incorporated by reference herein in their entirety.

FIELD OF INVENTION

Various configurations of the current invention relate generally to apparatus, systems, and methods for heating water. More particularly, the apparatus, systems, and methods relate to heating water in a water tank. Specifically, the apparatus, systems, and methods provide for heating water with a flow-through heating element located in a lower portion of a water tank.

BACKGROUND

Heated water is customarily provided in commercial aircraft lavatories for hand-washing purposes as well as in galleys for food and hot beverage preparation. There are a number of requirements for such systems that place many limitations on the designs which may be satisfactorily employed. A suitable system should provide needed heated water in as an efficient manner as possible. The amount of electrical power used for heating is limited because aircraft minimize the weight and cost of equipment and the use of less power helps accomplish these goals. It is also desired to keep repair and replacement expenses to a minimum.

One widely-used system accomplishes some of these goals but also has certain deficiencies. That system employs a tank containing two or more electrical heating elements immersed in water. A major shortcoming of that system is that a portion of water is in contact with the heater and is heated to a high temperature, possibly even boiling. This type of water heater may have the undesirable consequence that over time calcification or other impurities form mineral deposits on the heating elements. The deposits are poor thermal conductors and hence, overtime, additional power is required to heat the water. Further, the deposits hasten the need to replace the heating elements or the entire unit. What is needed is a better water heater.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to water heater systems and, more particularly, to water heater systems with integrated thermal mixing valves.

The embodiments described herein provide a water heater system with an integral thermal mixing valve that helps maintain prevent scalding and/or maintains suitable water temperature.

Figure 1A:
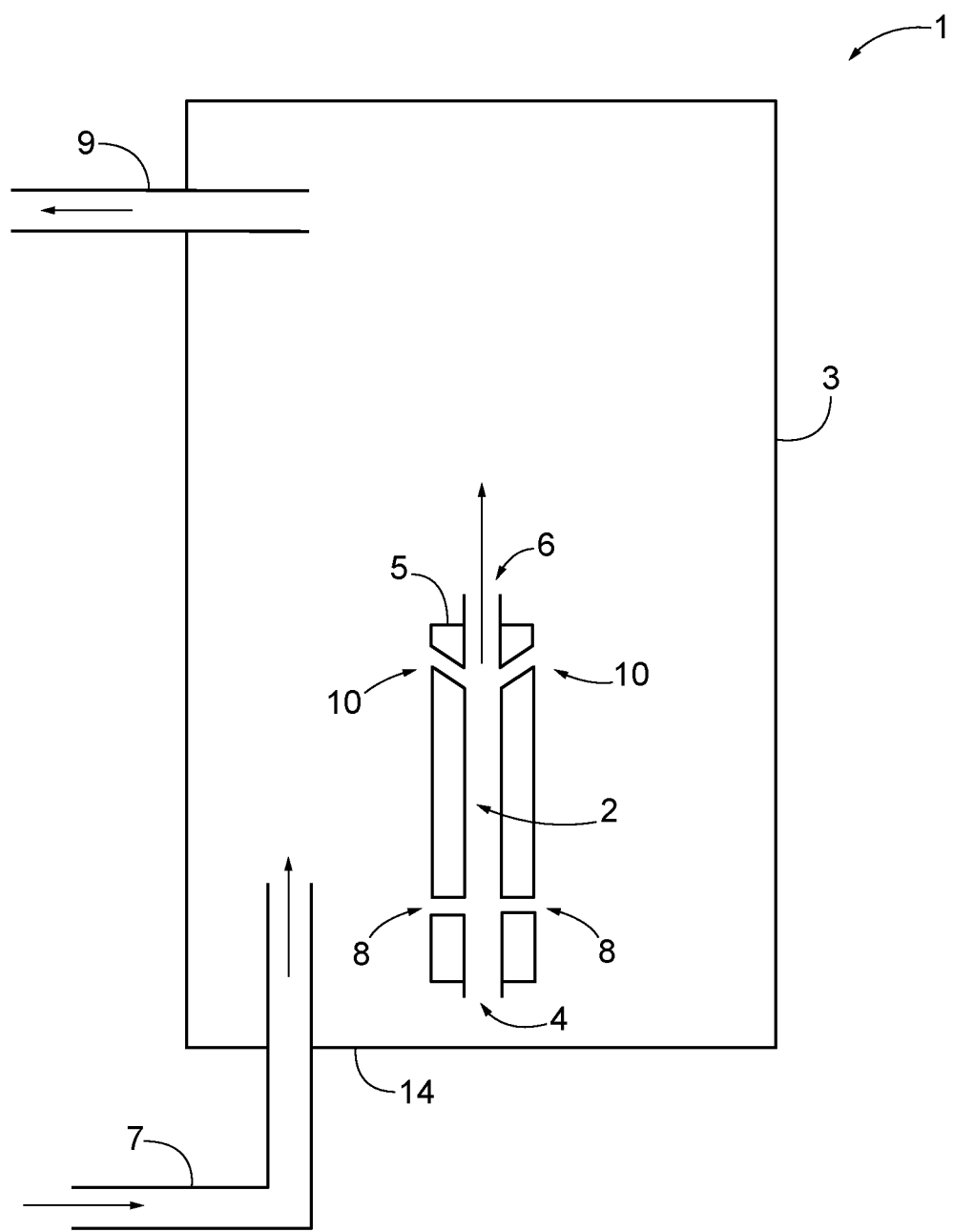
FIG. 1A illustrates a cross-section schematic view of an example first embodiment of a water heater with a flow-through heating element contained within a water tank that may incorporate the principles of the present disclosure.

FIG. 1A illustrates a cross-sectional view of a first embodiment of a water heater 1 that includes a water tank 3 and a flow-through heating element 5. Water tank 3 includes an input line 7 for receiving water into water tank 3 from a source of potable water that may be located remote from water heater 1. Initially, when water tank 3 is empty, it may be filled by injecting water into it from input line 7.

Water tank 3 further includes an output line 9 for dispensing heated water from water tank 3. A bottom opening 4 of heating element 5 receives water from tank 3 so that it may be heated and/or reheated by flow-through heating element 5 as the water passes through an interior 2 of the heating element 5 and is re-injected into water tank 3 out of a top opening 6. In some embodiments, flow-through heating element 5 may be a "Watlow" type of inline heater similar to flow-through/inline heaters manufactured by Watlow Electric Manufacturing Company. Additionally, a central tube of the heating element 5 may be a convoluted tube for more efficient heat transfer.

The subject matter of the present disclosure features a water heater 1 that includes using a flow-through heating element 5 near the base/bottom 14 of water heater 1. In this configuration, heating element 5 is positioned so that its bottom opening 4 is near bottom wall 14 of water tank 3 and the rest of heating element 5 is internal to water tank 3. As discussed below, heating element 5 may be placed in other positions as understood by those of ordinary skill in the art. Positioning heating element 5 near bottom of water tank 3 causes a pressure to be created to recirculate water in water tank 3. This is because the introduction of heated water in this orientation results in the lighter heated water flowing upward toward the top of water tank 3 allowing cooler water to be displaced with this warmer water as the warmer water travels generally upward creating an upward pressure. The upward flowing of heated water that displaces cooler water may act to mix/churn water in water tank 3 so that the water may be more uniformly heated. In some configurations, a fan nozzle may be placed at the upper end of flow-through heating element 5 to disperse heated water as it leaves heating element 5. Other configurations may utilize a directional nozzle at upper opening 6 to direct heated water in a particular direction as it leaves heating element 5 to create a desired circulation between warm and cool water within tank 3. The present invention further utilizes recirculation, temperature differential, and uses positive pressure to heat water rather than simple contacting of a heating coil. The present invention further includes focusing on not increasing surface heating area to heat water but to, rather, running water through flow-through heating element 5 multiple times. Water tank 1 of FIG. 1A may be completely filled to maximize water that may be stored in water tank 1 or, alternatively, provide for a smaller water tank that can hold the same amount of water.

In some configurations, flow-through heating element 5 has an elongated interior channel that acts as a conduit allowing flow-through heating element 5 to heat water as it travels from an input end of this channel upward to an output end of the channel. This allows heating element 5 to act as a thermodynamic pump capable of moving water by temperature differences without requiring moving parts. Heating element 5 creates water velocities within water tank 3 that contribute to the reduction in biofilms and bacteria while promoting efficient thermal mixing within water tank 3. Additionally, a pumping velocity changes as the temperature differential from the input end to the output end of flow-through heating element 5 reaches a maximum heating level. The improved thermal mixing also reduces the recovery time when hot water is drawn from water tank 3. This is a significant improvement over prior art water heaters using tubular heating elements which over time may cause thermal stratification contributing to the breakdown of sanitary conditions inside prior art tanks.

In other configurations, flow-through heating element 5 may have one or more optional lower side openings 8 and one or more optional upper openings 10. Lower openings 8 and or bottom opening 4 may allow cool water to enter heating element 5 near its bottom end and to be heated before exiting upper side openings 10 and/or top opening 6. Those of ordinary skill in the art will appreciate that flow-through heating element 5 may have other openings in other positions and or may have elongated conduits extending from its main elongated interior channel to allow water to be pulled into heating element 5 from other places within tank 3 and for heated water to be distributed to other places within tank 3 to maintain an overall desired circulation pattern within tank 3 between cooler and warmer water. In some configurations, elongated conduits extending from its main elongated interior channel may branch out within water tank 3 with a tree shaped pattern.

Figure 1B:
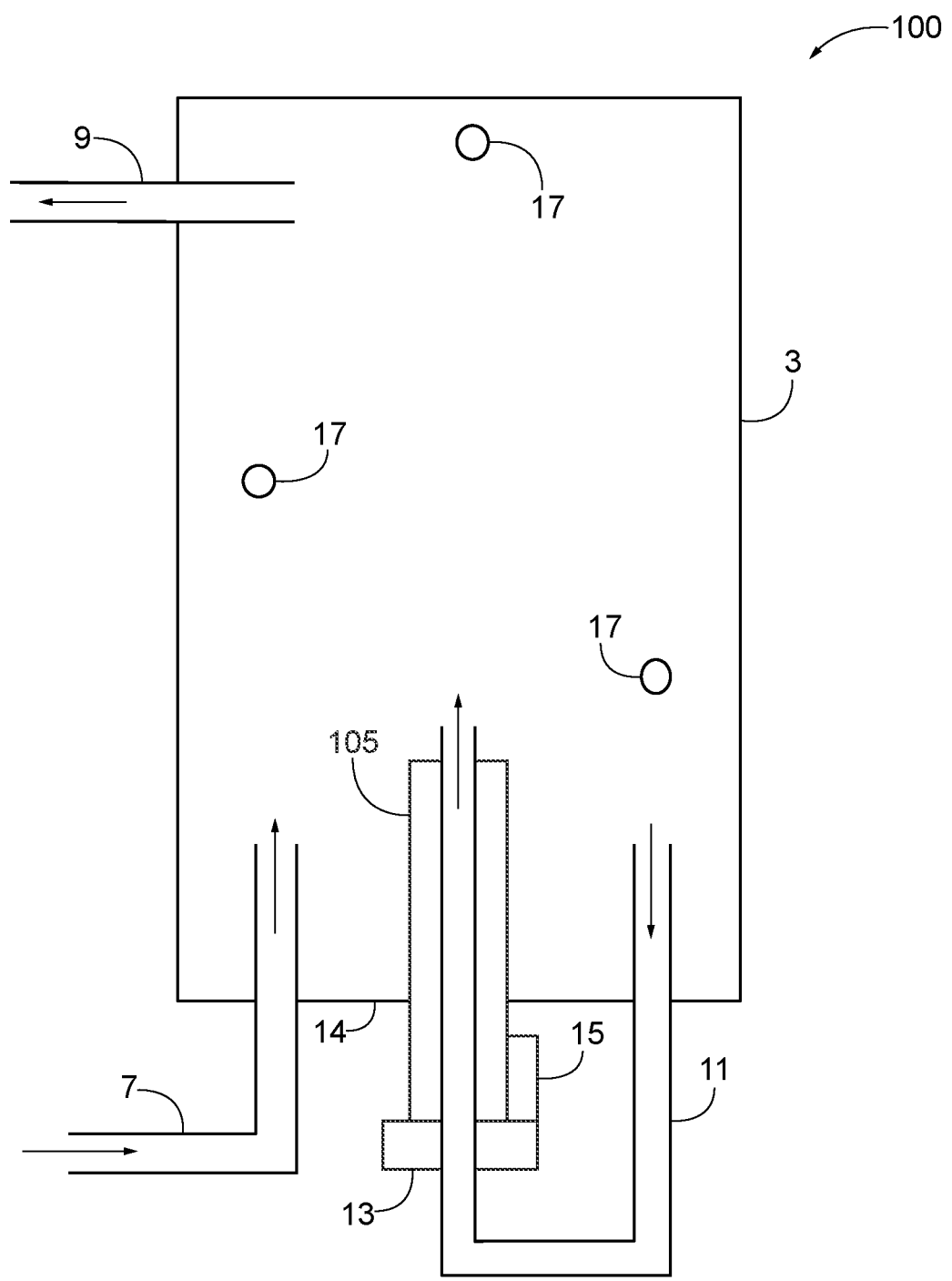
FIG. 1B illustrates a cross-section schematic view of an example second embodiment of a water heater with a flow-through heating element partially extending from a bottom portion of a water tank that may incorporate the principles of the present disclosure.

FIG. 1B illustrates another cross-sectional view of a second embodiment of a water heater 100 that also includes water tank 3, a flow-through heating element 105, water input line 7, and output line 9. This configuration additionally includes a recirculation line 11 connected to heating element 105. Recirculation line 11 removes water from water tank 3 and sends it through a flow-through heating element 105 so that it is heated and/or re-heated and re-injected into water tank 3. The present invention features a water heater 100 that includes using a flow-through heating element 105 similar to the heating element of FIG. 1A and that is near the base/bottom 14 of water heater 100. For example, the heating element 105 may be positioned near the base 14 of water heater 100 so that a top end of heating element 105 extends into water tank 3 and a bottom end extends below bottom wall 14 of water tank 3 as illustrated in FIG. 1B. In another configuration, heating element 105 may be positioned so that its top end is near bottom wall 14 of water tank 3 and the rest of heating element 105 is external to water tank 3. As discussed above with reference to FIG. 1A, heating element 105 may be positioned so that its bottom end is near bottom wall 14 of water tank 3 and the rest of heating element 105 is internal to water tank 3. The heating element 105 may be placed in other positions as understood by those of ordinary skill in the art. As previously mentioned and described, positioning heating element 105 near bottom of water tank 3 causes a pressure to be created to recirculate water in water tank 3.

As illustrated in FIG. 1B, some configurations of water heater 100 may include an optional water pump 13 and a controller including control logic 15 to assist flow-through heating element 105 to control a speed that water is re-circulated through water tank 3. For example, control logic 15 may evaluate temperatures recorded by different temperature sensors 17 at different locations within water tank 3. During periods of high usage, temperature sensors 17 may detect generally lower temperatures prompting control logic 15 to run pump 13 at a higher speed and/or increasing heat that heating element 105 produces so that more water is heated. Optionally if different temperature sensors 17 record differing temperatures, it may be an indication that water within water tank 3 is not well circulated to, again, cause control logic 15 to run pump 13 at a higher speed and/or increase heat that heating element 105 produces. If temperature sensors 17 detect a temperature above an upper threshold amount, this may cause control logic 15 to turn off or reduce the heat that is produced by heating element 105 and/or to reduce the speed of pump 13 or to turn off pump 13.

"Logic", as used herein, includes but is not limited to hardware, firmware, software, and/or combinations of each to perform a function(s) or an action(s), and/or, to cause a function or action from another logic, method, and/or system. For example, based on a desired application or need, logic may include a software-controlled microprocessor, discrete logic such as an application-specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Water heater 100 may be produced sufficiently small so that it may be provided in commercial aircraft lavatories to provide hot water for such uses as washing hands and galleys for the preparation of hot beverages. Preferably, water heater 100 is made with rigid materials as understood by those of ordinary skill in the art. For example, water heater 100 may be produced using metallic pipes and couplings with water tank 3 formed with rigid metallic walls. In some configurations, water tank 3 may be a seamless plastic tank or a tank formed with other materials as understood by those of ordinary skill in the art.

Figure 2:
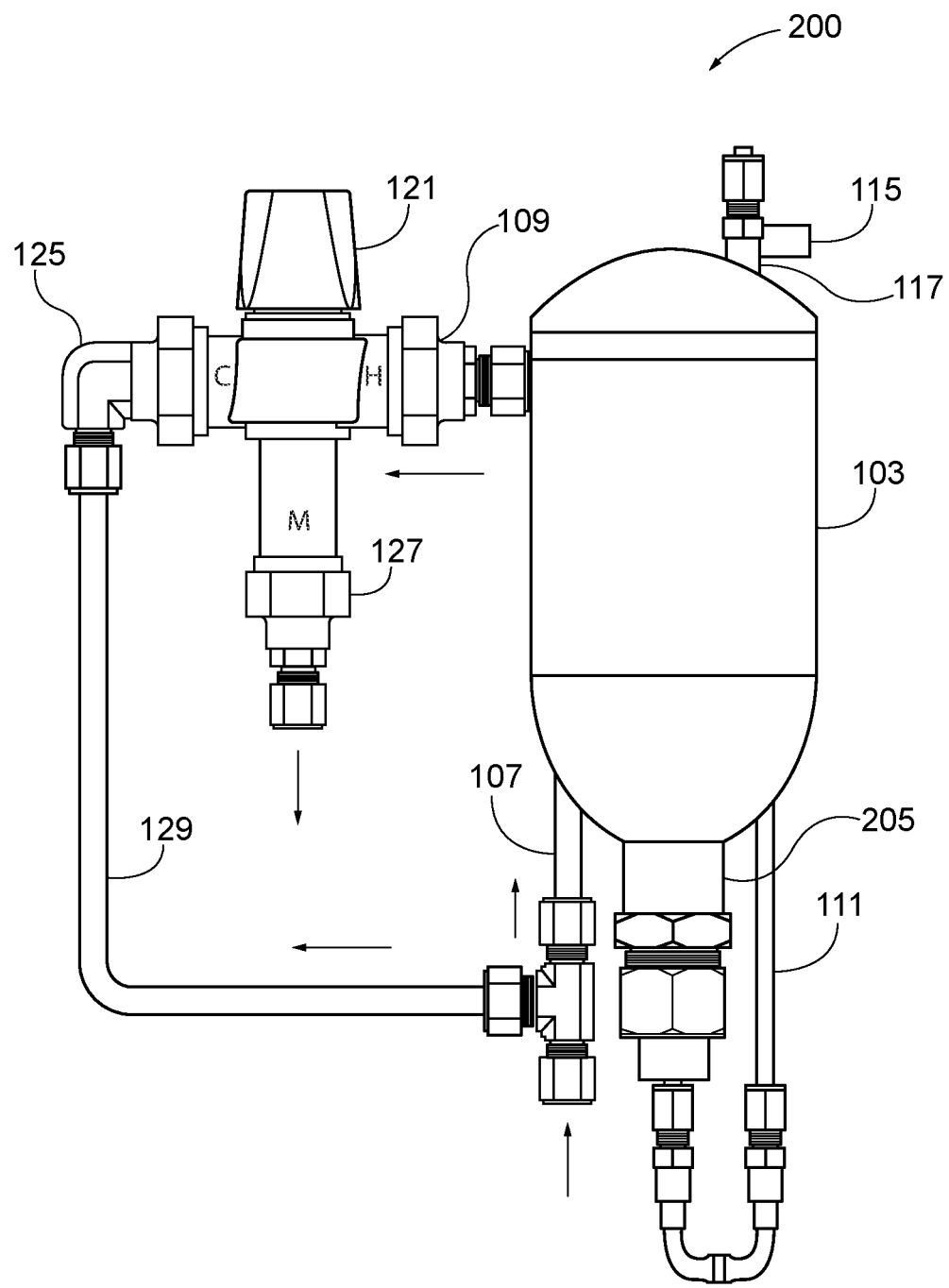
FIG. 2 illustrates a front view of a third embodiment of a water heater that may incorporate the principles of the present disclosure.
Figure 3:
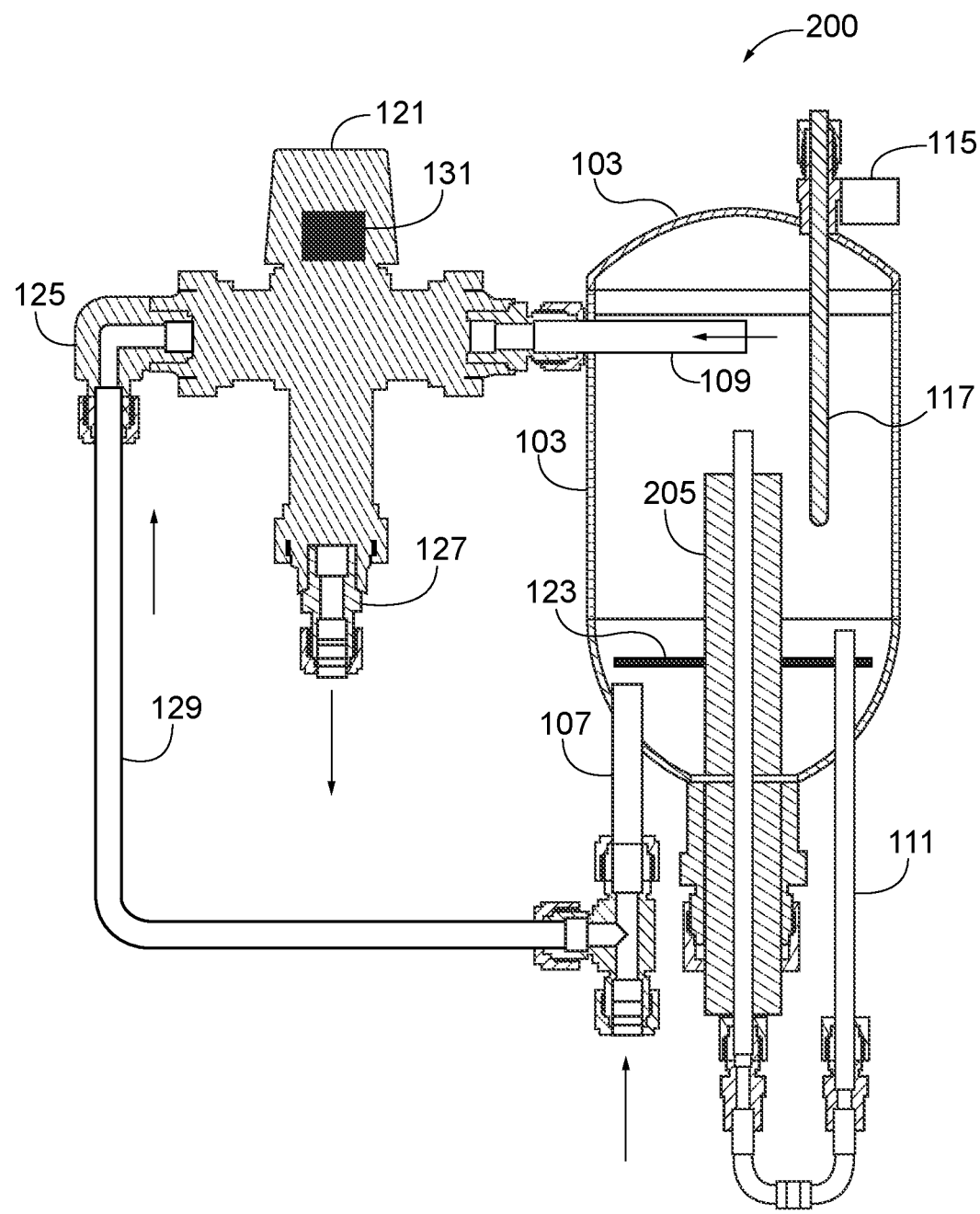
FIG. 3 illustrates a cross-section view of the third embodiment of a water heater that may incorporate the principles of the present disclosure.

FIGS. 2 and 3 illustrate a further embodiment of a water heater 200 that in some configurations may be used in aircraft. Similar to water heater 100 of FIG. 1, water heater 200 has a water tank 103, a flow-through heating element 205, a water input line 107, a water output line 109, a water recirculation line 111, and a control logic 115. Water heater 200 further includes a thermocouple 117, a mixing valve 121, and an optional water deflection plate 123. Deflection plate 123 may optionally be a flat water deflection plate with side slots allowing a limited volume of water to past through while water on the other side of deflection plate adjacent to the slots is pulled by water passing through slots to create a churning action. This churning action promotes thermal mixing within the tank while reducing areas for biofilm development and reducing bacterial entrapment within water tank 103. Recirculation line 111 exits near a bottom end of water tank 103 and is injected into a bottom end of heating element 205. In other configurations, recirculation line 111 may exit water tank 103 at other different locations.

Mixing valve 121 may be added to the outlet line 109 external to water tank 103 to prevent personnel from being scalded by the high temperature of water exiting the system. Thus, the outlet line 109 may also serve as an inlet to the mixing valve 121. As understood by those of ordinary skill in the art, mixing valve 121 may be a thermostatic mixing valve and may be adjustable. As illustrated, mixing valve 121 further includes a cold water input line 125 and an output line 127. Mixing valve input line 125 is connected to input line 107 with a T-connector and line 129. Hot water from the output line 109 of the water tank 103 is mixed with cool water from the input line 125 and output through output line 127. Thus, mixing valve 121 may act as an anti-scalding valve that facilitates operation of the hot water tank above temperatures that promote bacterial growth, thus the maintaining of sanitary conditions while protecting hot water users from being scalded.

For example, hot water from water tank 103 after being heated above 131° F. (to reduce bacteria growth) enters mixing valve 121 and is mixed with cold water from input line 125 and exits output line 127 at a lower preset temperature for washing hands or beverage preparation. Keeping heated water in water tank 103 above 131° F. may prevent some bacterial growth and use of mixing valve 121 provides water supplied to the lavatories and galleys of a desired temperature between 95° F. to 115° F. to prevent personnel from being scalded. These temperatures may be consistently achieved during the draw and recovery period by the water heater 200 of FIGS. 2 and 3. It should be appreciated that the described temperatures and temperature ranges are one example and that the water tank 103 may be configured to store and supply water at other suitable temperatures and temperature ranges, for example, 125° F.

In other configurations, it may be desirable to heat water in tank 103 to a higher temperature than 131° F. to prevent other bacteria growth and to kill existing bacteria. As hot and cold water enters mixing valve 121, in some configurations, an optional thermostat 131 in mixing valve 121 may sense the outlet water temperature. The thermostat 131 reacts by adjusting the incoming amounts of hot and cold water to maintain a stable output temperature. In some mixing valves, a mechanical adjustment of mixing valve 121 allows one to preset the maximum desired temperature.

Thermocouple 117 may sense temperature within water tank 103 and used by a control logic 115 to monitor and control the water temperature inside water tank 103. The functionality of control logic 115 may be similar to the functionality of control logic 15 of FIG. 1B described above. Similar to the water heater 100 of FIG. 1B, flow-through heating element 205 is located near the bottom of water tank 103. Heating element 205 may be placed in other positions as understood by those of ordinary skill in the art. Heating element 205 is commonly a "flow-through" type of heating assembly because, in some configurations, heating element 205 flows water through its entire length during heating. Warmed water exiting heating element 205 creates a pressure head inside water tank 103 which contributes to the thermodynamic pumping action and thermal mixing of water within water tank 103. As previously mentioned, this enables water heater 200 to maintain a generally uniform water temperature within water tank 103 above a predetermined value to maintain sanitary condition within water tank 103.

Figure 4:
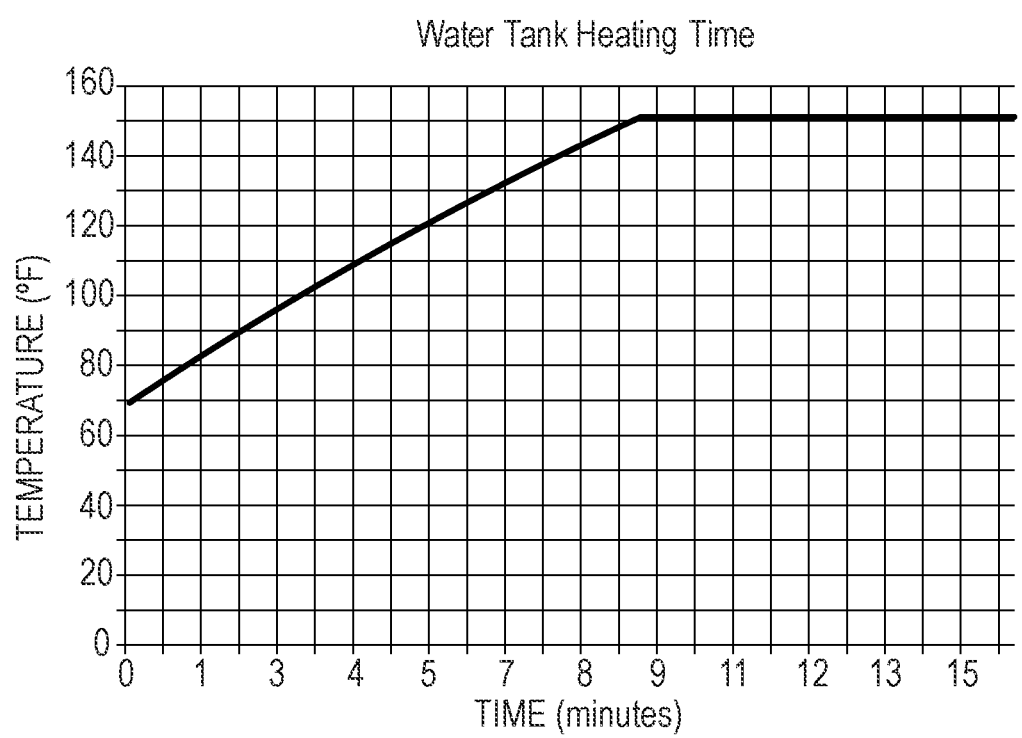
FIG. 4 illustrates the water tank heating time of the third embodiment of a water heater that may incorporate the principles of the present disclosure.
Figure 5:
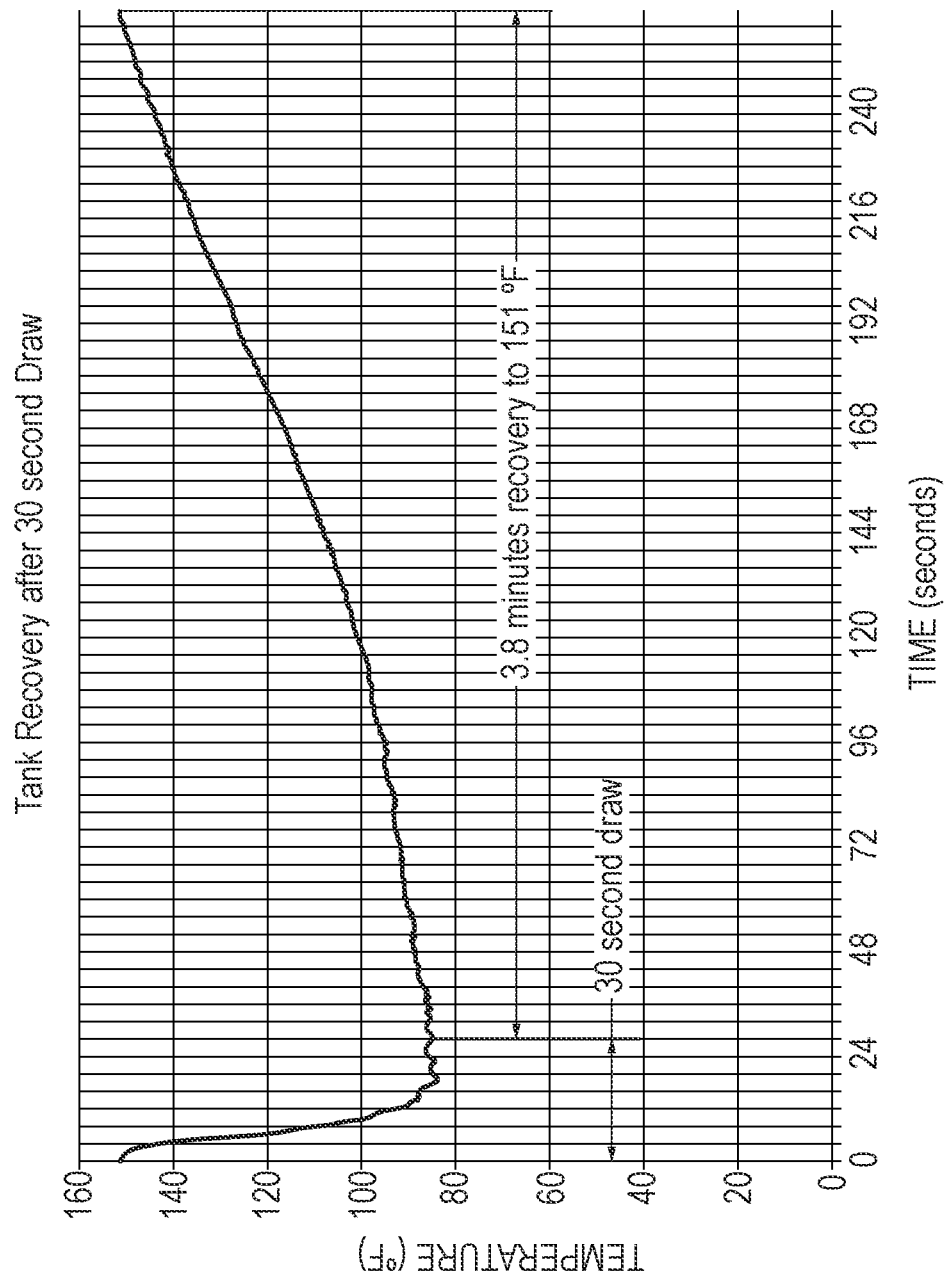
FIG. 5 illustrates the water tank recovery time of the third embodiment of a water heater that may incorporate the principles of the present disclosure.

Power to the flow-through water heater 205 is controlled to keep the temperature of water in tank 103 nearly constant during both the draw and idle periods. FIG. 4 is an exemplary graph of the initial heating time of water tank 103 with flow-through heating element 205 powered with 410 watts in one embodiment. FIG. 5 is an exemplary graph of the recovery time of water tank 103 with flow-through heating element 205 powered with 410 watts in this same exemplary embodiment.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
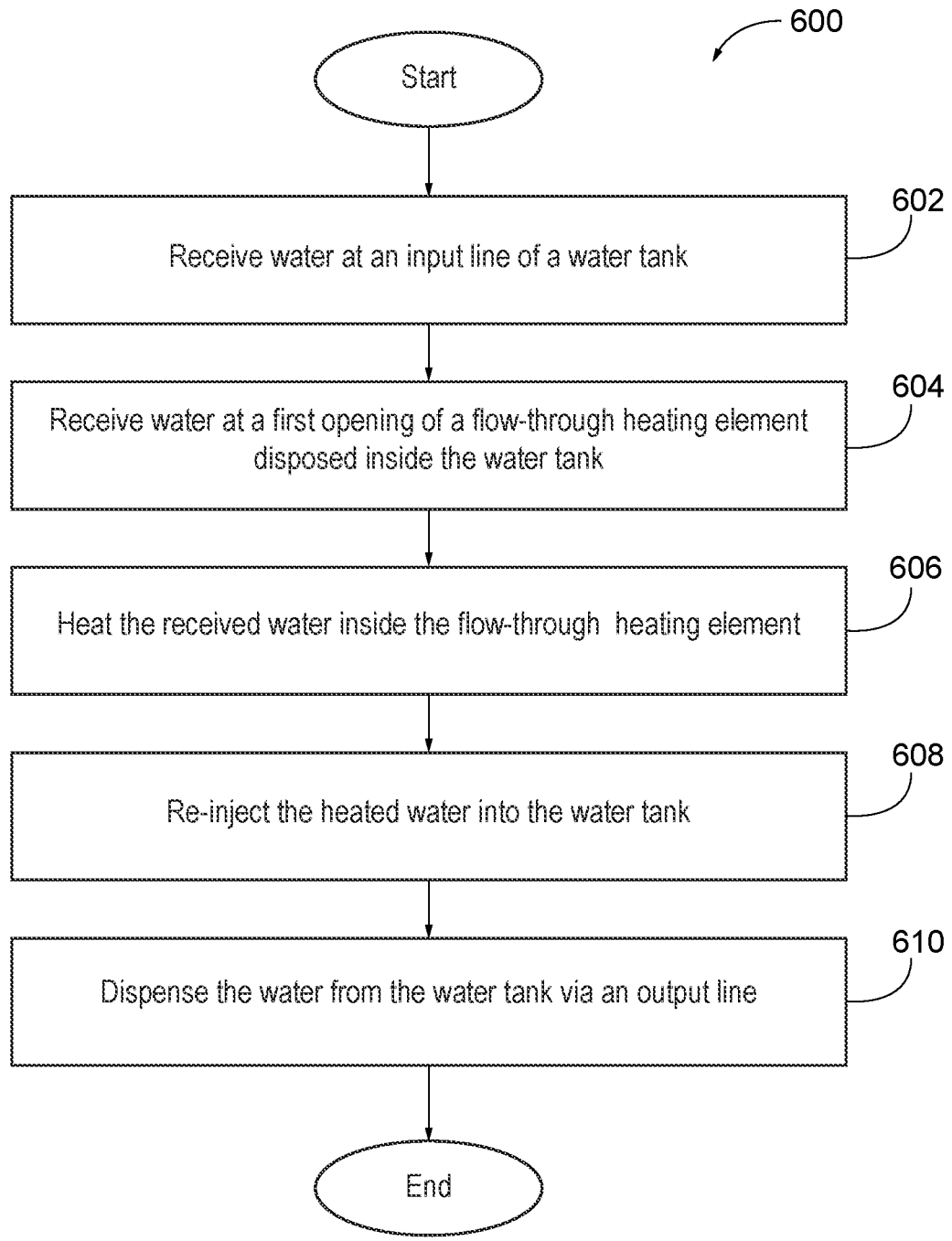
FIG. 6 illustrates another embodiment that is an exemplary method of heating water.

FIG. 6 illustrates a method 600 of heating water in a water tank. The method 600 begins by receiving water at an input line of a water tank at 602. In some configurations, a recirculation line may be used to flow water into the heating element as illustrated in FIGS. 1B, 2 and 3 and as discussed above. This recirculated water is then received at a first opening of a flow-through heating element disposed inside the water tank at 604 and heated inside the flow-through element heating element at 606. In one example, the heating element is at least partially located near a bottom portion of the water tank. The heating element may be a flow-through type heating element where water is heated while flowing from an input opening to an output opening of an elongated channel of the heating element. The heated water is the re-injected the heated water into the water tank at 608 and dispensed from the water tank via an output line at 610.

Other embodiments of method 600 may heat water above a temperature to kill bacteria such as *Legionella* and prevent unwanted biofilms. As discussed above, in other embodiments, method 600 may cool the heated water when it is removed from the tank with a line of cooler water so that it is safe for use. In another embodiment, method 600 may deflect water within the water tank with a deflection plate with openings/slit openings or deflect water in another way to promote thermal mixing of the water.

FIGS. 7-10 illustrate an alternate embodiment of a hot water tank with a thermostatic mixing valve ("TMV"). The TMV is adjustable and designed to automatically control the outlet water temperature, subject to user adjustment, to prevent scalding. In addition, the TMV may be arranged on the hot water tank in a manner that makes it easily accessible so as to facilitate replacement and/or maintenance when in use, for example, in confined spaces.

Figure 7A:
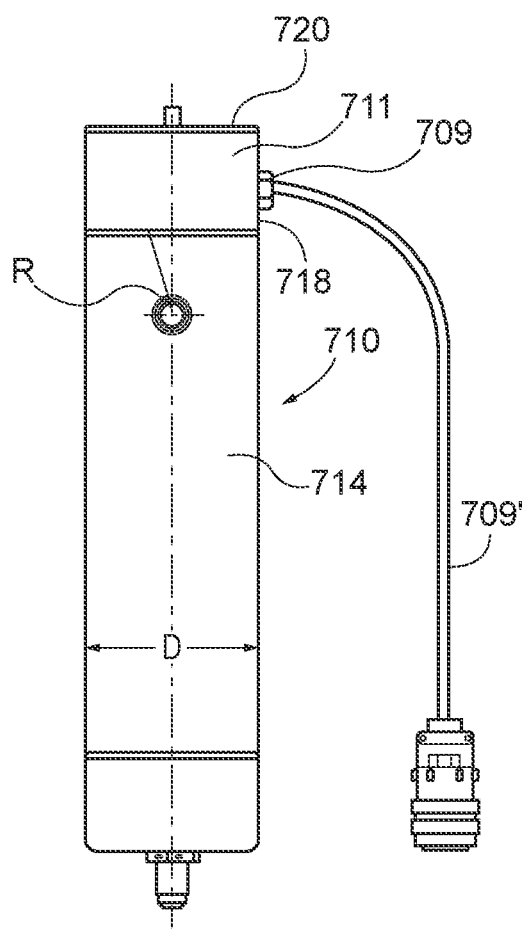
FIGS. 7A and 7B illustrate a side profile view and a side cross-section view, respectively, of an embodiment of the water heater having a thermostatic mixing valve that may incorporate the principles of the present disclosure.
Figure 7B:
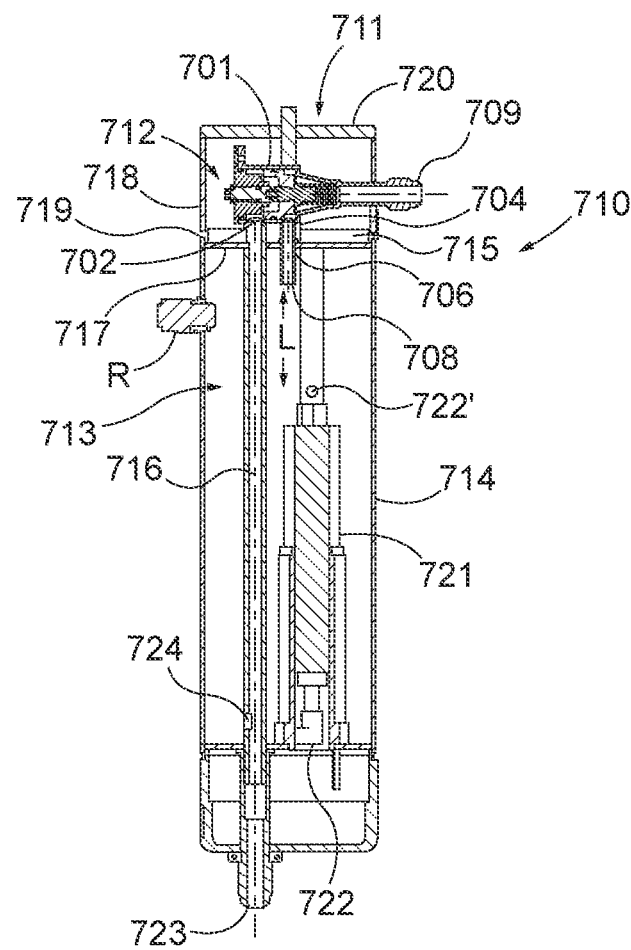

FIGS. 7A-7B illustrate a hot water system 700 (sometimes referred to as the system 700) according to one or more embodiments. As illustrated, the hot water system 700 includes a thermostatic mixing valve 701 and a water heater 710. In the illustrated embodiment, the TMV 701 is integral with the water heater 710; however, it will be appreciated that the TMV 701 may be arranged with alternate water heaters without departing from the present disclosure. In one or more embodiments, the TMV 701 is made from wetted materials, including materials suitable for potable drinking water systems, such as stainless steel.

In the illustrated embodiment, the water heater 710 includes a tank 714 at a lower end thereof and a cap 711 at an upper end of the water heater 710. Here, the cap 711 defines a mixing valve chamber 712 and the tank 714 defines a hot water chamber 713 having a diameter D that is filled with fluid (i.e., hot water). In this embodiment, the mixing valve chamber 712 is separated from the hot water chamber 713 by a barrier or wall 715 that inhibits the free flow of fluid between there-between. In some embodiments, the barrier 715 comprises an insulator material, as known in the art. It will be appreciated that, with this arrangement, the cap 711 may be provided as a detachable unit that may be removed from the remainder of the hot water tank 710 (and without exposing the contents of the hot water chamber 711 to the ambient environment), thereby making the hot water system 700 a modular system. In the illustrated embodiment, the cap 711 has a threaded base 717 that may be removably attached to a threaded adapter 719 that is provided at the upper end of the tank 714 of the water heater 710. It will be appreciated that, in other embodiments, the threaded base 717 and threaded adapter 719 may be differently arranged with on the hot water tank 710 and/or a different connection or fastening means may be utilized to connect the cap 711 to the tank 714 without departing from the present disclosure. Moreover, in some embodiments, the system 700 includes a relief valve R as illustrated in FIG. 7A.

In the illustrated embodiment, the TMV 701 is enclosed within mixing valve chamber 712 of the cap 711, which is situated on top of the tank 714. In addition, the TMV 701 is secured within the mixing valve chamber 712, for example, via a threaded stud extending out of the top end of the cap that is opposite the threaded base 717; however, the TMV 701 may be differently secured therein as appreciated by those skilled in the art. In such embodiments, the cap 711 is a housing type structure in which the TMV 701 is enclosed. Accordingly, the cap 711 includes a sidewall 718 that surround the periphery of the TMZ 701 and a lid 720. Here, the sidewalls 718 are cylindrical and are essentially an extension of tank 714; however, other arrangements of the sidewalls 718 and lid 720 may be provided without departing from the present disclosure. In some embodiments, the lid 720 is removable to facilitate maintenance of water heater 710 and/or installation or replacement of TMV 701. In addition, the cap 711, including its sidewalls 718 and lid 720, may be made of various materials, for example, stainless steel 360 housing; however, other materials may be utilized, including those that are suitable for potable drinking water systems.

In some embodiments, fluid is introduced into the thermostatic mixing valve 701 via two (2) passage ways, a cold fluid inlet 702 and a warm fluid inlet 704, whereas fluid of mixed temperature exits the TMV 701 via a fluid outlet 709 that may be fitted with an outlet line 709' that is, for example, adapted to interconnect the system 100 to a sink, shower, or other on demand source of water. The cold-water inlet 702 of TMV 701 may be connected to a common cold water conduit 716 of water heater 710 as depicted, whereas the warm water inlet 704 of TMV 701 may extend into tank 714, for example, via warm water conduit 706 having a warm water inlet opening 708. In some embodiments, the fluid outlet 709 extends exterior the cap 711, whereas in other embodiments, the fluid outlet 709 is terminates within the valve chamber 712 and is fitted with an extension such as 709' that extends exterior the cap 711.

FIG. 7 depicts an embodiment the cold-water conduit 716 according to one or more embodiments. Here, the cold-water conduit 716 extends from the cold-water inlet 702 of the TMV 701 and runs through the interior hot water chamber 713 of the tank 714. In this embodiment, the cold-water conduit 716 terminates at an opening 723 that is exterior of the hot water chamber 713 and is the point at which cold water is introduced into the hot water system 700. In addition, the cold-water conduit 716 may include an opening 724 through which at least some of the cold water is introduced into the hot water chamber 713; however, the common cold water conduit 716 may be differently oriented with respect to TMV cold-water inlet 702 and opening 724.

As mentioned, FIG. 7 also depicts the warm water inlet 704 of TMV 701 connected to the conduit 706 that extends downward into the top of tank 714 (i.e., into the hot water chamber 713 thereof) so that the opening 708 of the conduit 706 withdraws water near the top of the water column defined by the hot water chamber 713, as the temperature of water column near the top of the water column tends to be warmer than the temperature of water column near the water column. In these embodiments, the unheated water that is introduced into the hot water chamber via the opening 724 is circulated through a heating element 721 that provides the heating function of the system 700. Here, the heating element has an opening 722 near the bottom of the hot water chamber 713 through which cooler water enters the heating element 721, as well as a hot water outlet 722' through which the warmer water is discharged from the heating element 721. In addition, the opening 708 of the warm water conduit 706 of the TMV 701 may located a distance L from the hot water outlet 722' of the heating element 721, and the distance L may be varied depending on the requirements of the particular end use application. In the illustrated embodiment, the distance L is a vertical distance equal to about two (2) to three (3) times the diameter D of tank 714; however, in other embodiments, the distance L may be other lengths, for example, at least two (2) times the diameter D of tank 714. It will be appreciated, however, that the heating element 721, including its inlet and outlet openings 722,722', may be differently arranged without departing from the present disclosure.

Locating the thermostatic mixing valve 701 at the top of water heater 710, for example, within the cap 711 that is disposed on top of the tank 714 such that the opening 708 is vertically spaced from the hot water outlet 722' a vertical distance L, may provide many benefits. Without being bound by theory, the temperature of the water column defined by the hot water chamber 713 varies within the depth of the tank 714 and, therefore, the coolest water will be located near the bottom of the water column, for example, proximate to the opening 724 where cold water is introduced into the hot water chamber 713; and the warmest water in the water column will be located near the top of the water column, for example, proximate to the hot water outlet 722' of the heating element 721. In operation, the cooler water near the bottom of the tank proximate the opening 724 will be mixed with warmer (or hot) water at the top of the water column, and the temperature differential existing in the water column in turn enhances the dynamic thermal mixing even when water is not being drawn into the TMV 701 from the hot water chamber 713.

As mentioned above, the common cold water conduit 716 introduces cooler water into the hot water chamber 713 of the tank 714 via the opening 724 proximate the bottom of the water column and may also introduce cooler water directly into TMV 701 via the cold water inlet 702, and this arrangement of the common cold water conduit 716 may also provide benefits to the system 700. For example, this arrangement may minimize the pressure differential to which the TMV 701 is exposed when mixing the warm and cool water. Large pressure differences between the opening 724 and the TMV warm water inlet 704 may cause temperature spikes at the outlet 709 of the system 700. Without being bound by theory, positioning the thermostatic mixing valve 701 and the mixed temperature water outlet 709 at the top of the water heater 710 may preheat the TMV 701 (i.e., keeps the various components of the TMV 701 preheated) to a sufficient level/temperature, such that most of the heat energy from the water column is transferred to the appropriate components of the TMV 701 (i.e., its thermostatic actuator) that respond to changes in temperature. These components of the TMV 701, including the thermostatic actuator, are more fully detailed below.

Figure 8A:
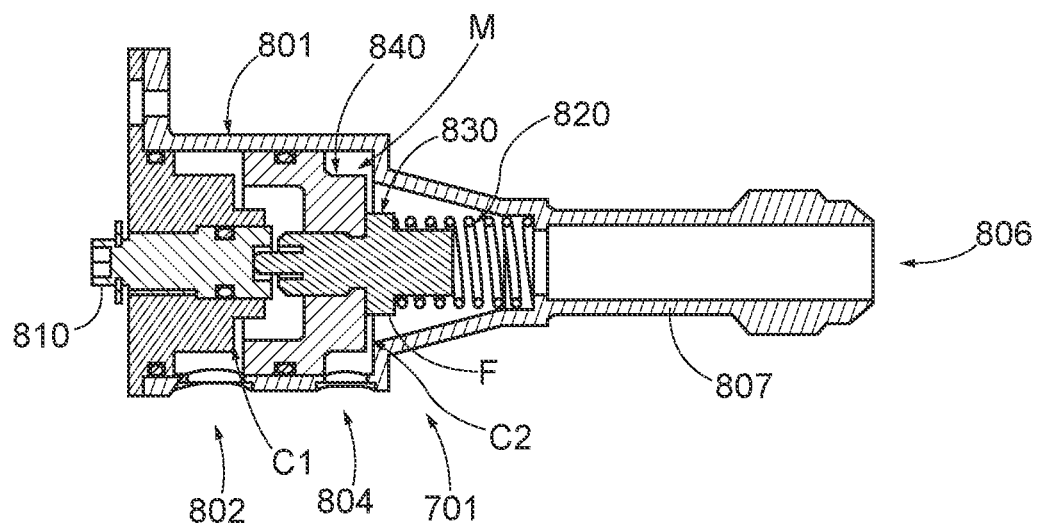
FIGS. 8A-8D illustrate various cross-section views of the thermostatic mixing valve of FIGS. 7A-7B.
Figure 8B:
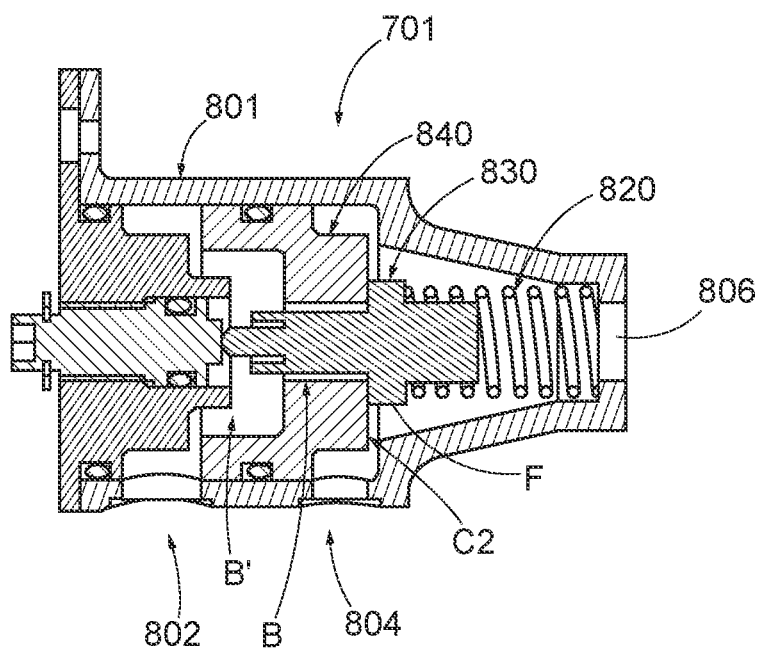
Figure 8C:
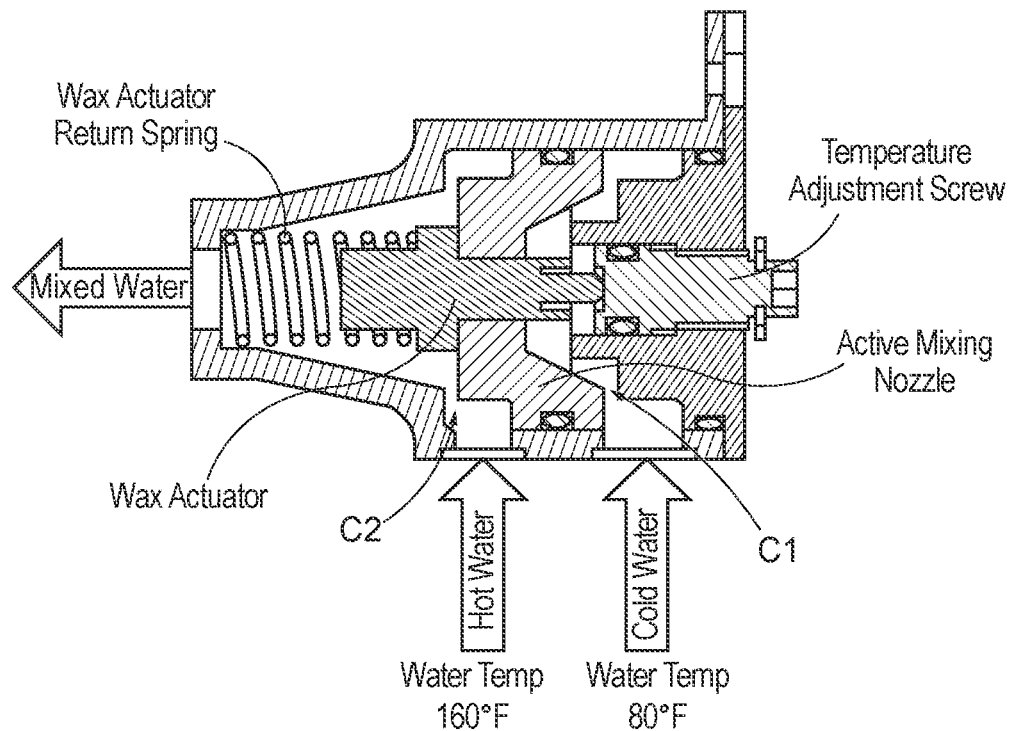
Figure 8D:
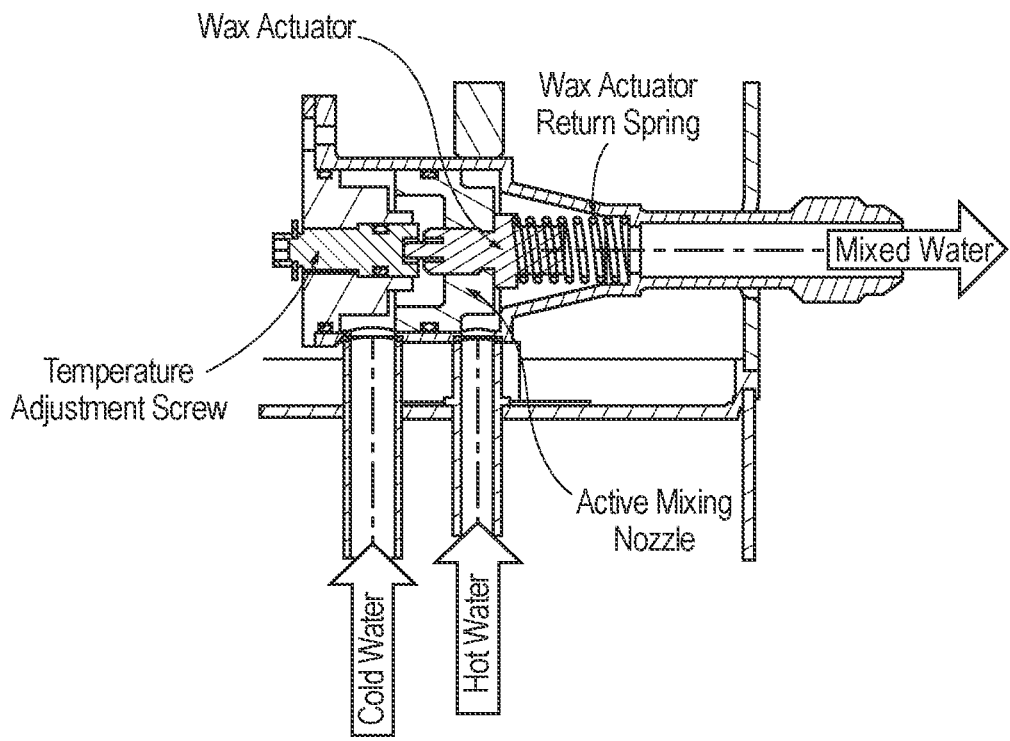

TMV 701 operates to ensure steady temperature of water flow exiting TMV outlet 806. FIGS. 8A, 8B, 8C, and 8D illustrate the thermostatic mixing valve 701, according to one or more embodiments. It will be appreciated that, while some of the components of the TMV 701 were previously identified with respect to FIGS. 7A-7B, some of those same components (and previously unidentified components) are again identified below with respect to FIGS. 8A-8D. Thus, as previously mentioned, the TMV 701 comprises a housing 801 having a cold-water inlet 802, a warm water inlet 804, and a mixed temperature outlet 806. In addition, the housing 801 defines a mixing chamber M. FIGS. 8A and 8D depict water outlet 806 of TMV 701 having an extension 807 installed thereon to allow water outlet 806 to extend beyond and out of a structure (e.g., the cap 702 defining the mixing valve chamber 712). Moreover, FIG. 8D depicts cold-water inlet 802 and warm water inlet 804 of the TMV 701 being fitted with the common cool water conduit 716 and the warm water conduit 706, respectively, whereas such inlet fittings/extensions are not depicted in either FIG. 8A or 8C. As will be appreciated, the TMV 701 operates to ensure steady temperature of water flow exiting TMV outlet 806.

In this example embodiment, the thermostatic mixing valve 701 further comprises a temperature adjustment screw 810, an actuator spring 820, (a thermal actuator 830, and an active mixing nozzle 840. The temperature adjustment screw 810 may be utilized to set a cold and hot water control gap C1,C2 defined by the orientation of the thermal actuator 830 within the mixing chamber M of the housing 801, thereby setting the desired temperature or ratio of warm and cold that is mixed in the flow exiting water outlet 806. Here, the adjustment screw 810 may be rotated clockwise or counterclockwise, which in turn displaces the active mixing nozzle 840 within the mixing chamber M, and the displacement or orientation of the active mixing nozzle 840 therein affects the amount of flow entering the cold water and warm water inlets 802, 804. For example, rotating the adjustment screw 810 counterclockwise a predetermined amount (e.g., all the way until it no longer rotates) would displace the active mixing nozzle 840 to a location/orientation where the cold water inlet 802 is fully or almost fully blocked so that mostly warm water enters the TMV 701 via the warm water inlet 804 and only a small amount of cold water (at most) enters the cold water inlet 802, such that the water flow exiting outlet 806 comprises a steady water flow of the desired temperature or desired ratio of warm water. In some embodiments, cold water is always being mixed with the hot water within the mixing chamber M to lower the TMV outlet 806 fluid temperature by at least some amount or degree. In the foregoing example, rotating the adjustment screw 810 clockwise a predetermined amount (e.g., all the way until it no longer rotates) may displace the active mixing nozzle 840 to a location where the warm water inlet 804 is fully (or almost fully) blocked so that only (or mostly) cold water enters the TMV 701 via the cold water inlet 802, and the water flow exiting outlet 806 comprises a steady water flow of the desired temperature or desired ration of cold water. Furthermore, the adjustment screw 810 may be adjusted or screwed to any number of rotational orientations between the two extremes (i.e., rotated fully clockwise or counter-clockwise), which in turn displaces the active mixing nozzle 840 to any number of locations between the cold and warm water inlets 802,804 so that both warm and cold water are entering the mixing chamber M and the water flow exiting outlet 806 comprises some desired temperature or ratio of warm and cold water. Thus, a user may adjust adjustment screw 810 to fine tune the ratio of warm to cold water entering the mixing chamber M and exiting the outlet 806 of the thermal mixing valve 701.

In the illustrated embodiment, the adjustment screw 810 operates as a positioning member and may be any type of screw known in the art. In one embodiment, the adjustment screw 810 comprises a 316 stainless steel set screw; however, the adjustment screw 810 may be comprised of other materials suitable for potable drinking water systems. In addition, other suitable members in lieu of the screw 810 may be utilized to displace and hold the active mixing nozzle 840 to and at the desired location within the mixing chamber M. For example, the positioning member may instead be a spring-loaded button that is pressed or depressed to displace the active mixing nozzle 840 to the desired orientation. It will be appreciated, however, that other types of positioning members may be utilized in lieu of the adjustment screw 810 as known in the art. Moreover, in other embodiments the adjustment screw 810 is spring loaded to provide a biasing force against the nozzle 840 opposite that applied by the actuator spring 820.

Also in the illustrated embodiment, the actuator spring 820 is a biasing element that biases the thermal actuator 830 so that it returns to equilibrium position in response to either engagement of the adjustment screw 810 and/or a temperature change. As illustrated, the actuator spring 820 is arranged within the housing 801 proximate to the outlet 806 and receives one end (i.e., the thermal expansion portion) of the thermal actuator 830 as hereinafter detailed. The actuator spring 820 may comprise any number of materials, including those that are suitable with potable water drinking systems. In one example, actuator spring 820 comprises a 17-7 pH stainless steel return spring. In other embodiments, a compliant biasing element is utilized in lieu of the actuator spring 820 and operates as described with reference to the actuator spring 820. It will be appreciated, however, that any number of biasing elements alternatives may be utilized as known in the art.

The thermal actuator 830 is a thermo-mechanical device capable of converting a temperature change into motion, and designed to operate within a pre-defined range of temperatures. Actuation of the adjustment screw 810 places the thermal actuator 830 (and the nozzle 840 arranged thereon) at a pre-calibrated position (i.e., a desired temperature). The nozzle 840 has a central bore that receives a guide portion of the thermal actuator 830 and is a shuttle member that travels within the mixing chamber M with the thermal actuator 830. In addition, the nozzle 840 abuts the flange F of the thermal actuator 840 and is arranged at a location proximate to the adjustment screw 810 such that movement of the adjustment screw 830 displaces the nozzle 840 between the cold and hot water inlets 802,804, thereby setting the cold and hot water control gaps C1,C2. As will be appreciated, the cold and hot water control gaps C1,C2 may inhibit temperature spikes. The thermal actuator 830 includes an expansion material that expands or retracts in response to a temperature change and, in the illustrated embodiment, is arranged on the portion of the thermal actuator 830 that is received within the spring 820 and proximate to the flange F. Accordingly, as the expansion material expands/retracts, the flange F of the thermal actuator 830 that abuts the nozzle 840 may displace the nozzle 840 to further control or regulate the flow of hot and cold water through cold and hot water inlets 802,804 such that a mixed water temperature flowing through the mixing chamber M remains steady, at the user's pre-set value. For example, the stability of the pre-set temperature is controlled as the expansion material reacts to a temperature increase by expanding and displacing the nozzle 840, which in turn simultaneously reduces the hot water control gap C2 and increases the cold water control gap C1 such that the outlet 806 temperature returns to the user's pre-set value.

Figure 9:
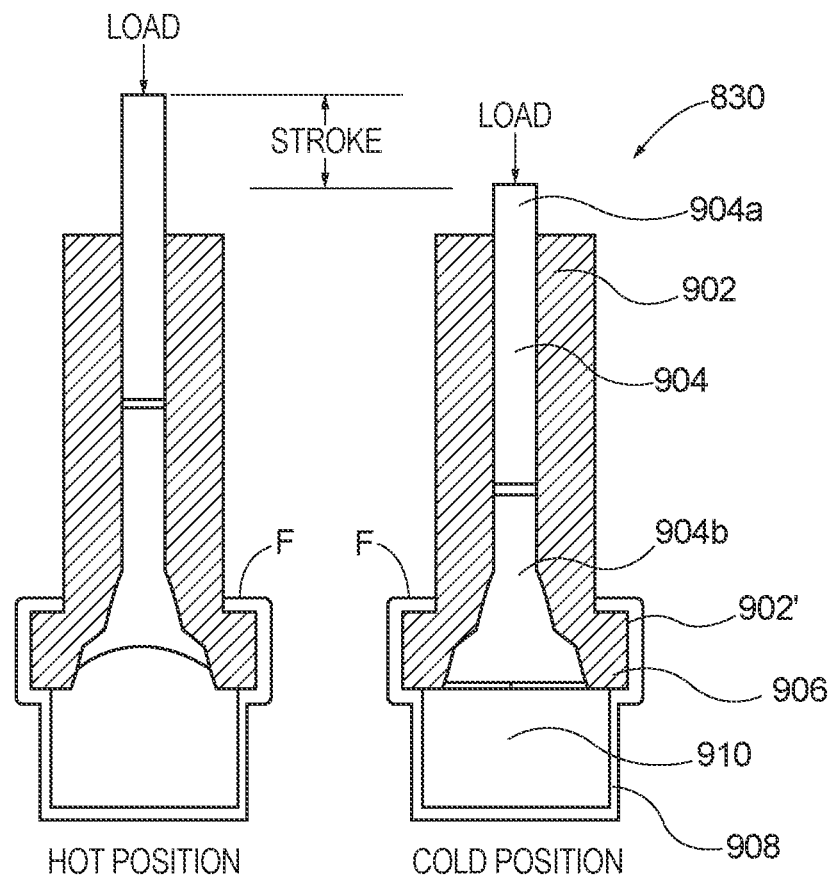
FIG. 9 illustrates an embodiment of the thermal actuator utilized in the thermostatic mixing valve of FIGS. 7A-7B.

In the illustrated embodiment, the thermal actuator 830 is disposed within the housing 801 of TMV 701 and arranged between the adjustment screw 810 and the actuator spring 820. In the illustrated embodiments, the thermal actuator 830 utilizes a wax as its expansion material; however, other materials may be utilized such as, for example, a shape memory alloy, a MEMS thermal actuator, or others as known in the art. FIG. 9 illustrates the thermal actuator 830 configured as a wax actuator, according to one or more embodiments. In this example, the thermal actuator 830 comprises (i) a hollow actuator guide 902 that is cupped or flanged at one end 902' to form the flange F; (ii) a piston 904 extending there-through that includes an end 904a that exits guide 902 at an end opposite of the flange F and a plug end 904b that extends into the flange F; (iii) a diaphragm 906 attached to the plug end 904b of the piston 904 within the flange F of the guide 902; and (iv) an expansion compartment 908 attached to the end of the flange F at the diaphragm 906 and containing an expansion material 910 therein.

In the illustrated embodiment, the expansion compartment 908 is arranged or nested within the adjustment spring 820 and, when the expansion material 910 within the expansion compartment 908 is exposed to temperature changes, it expands or retracts. The expansion/retraction of the expansion material 910 in turn displaces the diaphragm 906 and the piston 904 attached thereto a stroke distance, which in turn displaces the thermal actuator 830 and the active mixing nozzle 840 towards the spring 820 (i.e., in response to heat increase) to decrease control gap C2 and increase control gap C1, or towards the screw 810 (i.e., in response to heat decrease/cooling) to decrease control gap C1 and increase control gap C2. For example, the thermal material may expand in response to a heat increase thereby displacing the thermal actuator 830 and the active mixing nozzle 840 so as shrink/close the warm water inlet 804 (i.e., by shrinking the hot water control gap C2) and increase the cold water inlet 802 (i.e., and its control gap C1), thereby decreasing the amount of warm water entering the mixing chamber M. Moreover, the end 904a of the piston 904 extends beyond the guide 902 to interact with the adjustment screw 810, so that a user may adjust the maximum displacement of active mixing nozzle 840 within the mixing chamber M, thereby setting the minimums gap values for the cold and hot control gaps C1,C2. In this embodiment, the external components (i.e., the non-actuating components) of the thermal actuator 830 are comprised of an alloy, for example, a copper allow C90300; however, other materials may be utilized, including those that are suitable for potable drinking water systems.

Figure 10A:
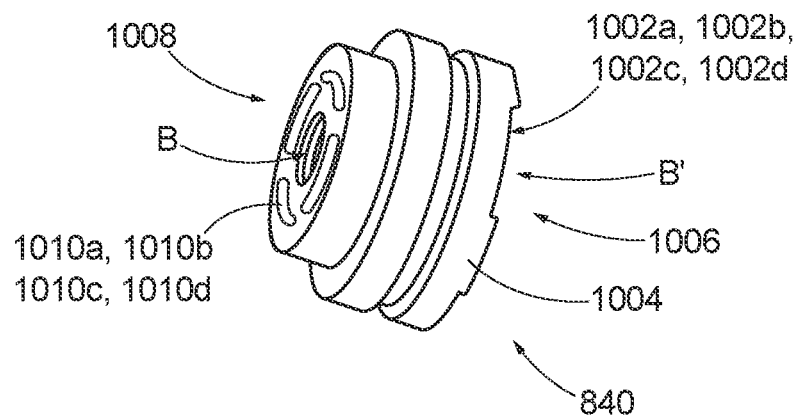
FIGS. 10A-10B illustrate an embodiment of the active mixing nozzle utilized in the thermostatic mixing valve of FIGS. 7A-7B.
Figure 10B:
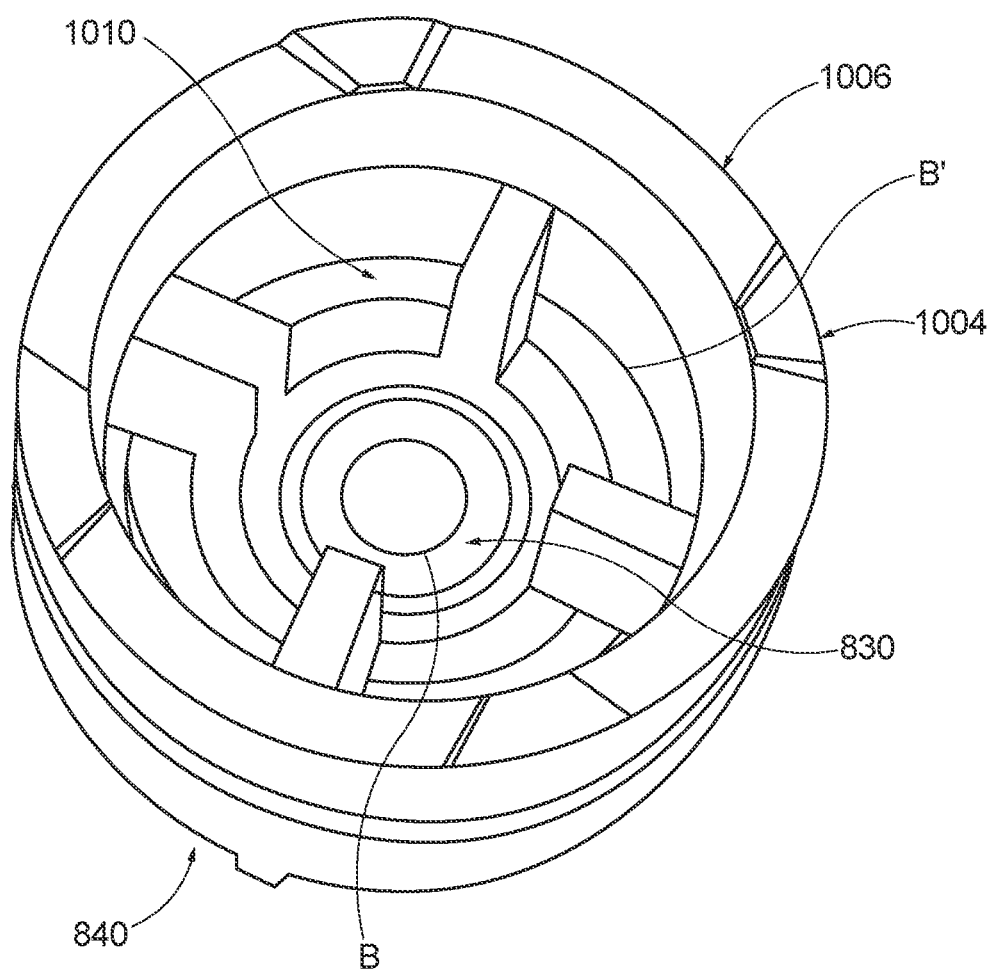

In some embodiments, hot water is always being drawn into the mixing chamber M from the top of the water column where the water temperature is the highest, and then mixed with pre-heated cooler water within the active mixing nozzle 840 of the TMV 701. FIGS. 10A-10B depicts the active mixing nozzle 840, according to one or more embodiments. In the illustrated embodiment, the active mixing nozzle 840 has four (4) slots (i.e., 1002a, 1002b, 1002c, and 1002d) formed or machined into an edge 1004 of a cold-water side 1006 of the nozzle 840. The nozzle 840 further includes a warm water side 1008 that is opposite the cold water side 1006, and a central bore B that extends through the nozzle from the cold water side 1006 (or a face thereof) to the warm water side 1008 (or a face thereof). As best illustrated in FIG. 10B, the central bore B is smaller at the warm water side 1008 than at the cold water side 1006, and is sized to receive the expansion compartment 908 (of the thermal actuator 930) when inserted therein from the warm water side 1008 of the nozzle 840. Stated differently, the central bore B that is proximate to the warm water side 1008 has a diameter that is smaller than the diameter of the larger bore portion B' that is proximate to the cold water side 1006. Here, the central bore B receives the expansion compartment 908 of the actuator 830 such that a bottom side of the flange F abuts the warm water side 1008 of the nozzle 840, and the central bore B opens with a larger diameter at the cold water side 1006. The nozzle 840 further includes a plurality of channels arranged around the central bore B, such as channels 1010a,1010b,1010c,1010d, which are formed through the face of the warm water side 1008 and extend into the larger portion B' of the central bore B proximate the cold water side 1006. When the nozzle 840 is arranged within the housing, the channels 1010a,1010b,1010c,1010d coincide with the mixing chamber M and form the passageway through which cold water flows from the cold-water inlet 802 to the mixed temperature water outlet 806.

In one embodiment, the slots 1002a-1002d are spaced 90 degrees apart; however, other special arrangement may be utilized other than 90 degrees along the circumference/periphery of the nozzle 840 and, moreover, more or less slots may be utilized at other orientations along the circumference/periphery. Without being bound by theory, however, the depicted configuration may reduce the thermal spikes that are known to occur. The slots 1002a-1002d also insure that there is a minimum amount of cold water flow to reduce the maximum hot water temperature flowing out of the outlet 806 of the thermostatic mixing valve 701 to a safe level. In the illustrated embodiments, the active mixing nozzle 840 is mostly directing the cold water flow to be mixed with the hot, and much of the mixing of warm and cold water streams occurs near the end of the thermal actuator that contains the thermal expansion material (i.e., much of the mixing occurs at an end of the housing 801 where the spring 820 is arranged). In one embodiment, the active mixing nozzle 840 is made from Polytetrafluoroethylene (PTFE); however, other materials may be utilized, including those that are suitable for potable drinking water systems. In addition, the nozzle 840 may include annular recesses along its outer periphery that receive one or more seals or gaskets such as, for example O-rings.

As mentioned above, positioning the thermostatic mixing valve 701 and its mixed temperature water outlet at the top of the tank (e.g., tank 714) keeps the TMV 701 components pre-heated to a point where most of the heat energy from the water column is transferred to the thermostatic actuator 830 (and the expansion material 910 therein) that responds to changes in temperature. This enhances the system's overall efficiency. For example, in the embodiment where thermal actuator 830 is a wax actuator, thermal expansion of the wax inside of the thermal actuator 830 moves the active mixing nozzle 840 to a position where the desired pre-set ratio of hot and cold-water mix is achieved at the mixed water temperature outlet 806 of the TMV 701.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A heating system, comprising:
   a tank defining an interior fluid chamber; and
   a thermal mixing valve arranged exterior of the tank comprising:
   a first fluid inlet that extends into the fluid chamber a first distance;
   a second fluid inlet that extends a second distance into the fluid chamber, the first distance being longer than the second distance; and,
   a fluid outlet exterior to the tank.

2. The heating system of claim 1, further comprising a heating element arranged within the interior of the fluid chamber, the heating element having an inlet and an outlet, wherein the outlet of the heating element is proximate to an upper region of the fluid chamber.

3. The heating system of claim 2, wherein the second fluid inlet of the thermal mixing valve includes an opening that is disposed proximate to the upper region of the fluid chamber, and wherein the outlet of the heating element is arranged below the opening of the second fluid inlet.

4. The heating system of claim 3, wherein the outlet of the heating element is arranged below the opening of the second fluid inlet by a distance that is about two (2) to three (3) times a diameter of the fluid chamber.

5. The heating system of claim 3, wherein the outlet of the heating element is arranged below the opening of the second fluid inlet by a distance that is at least two (2) times a diameter of the fluid chamber.

6. The heating system of claim 1, wherein the first fluid inlet comprises a conduit that extends through the fluid chamber of the tank and terminates at an opening that is exterior the fluid chamber.

7. The heating system of claim 6, wherein the conduit further comprises a second opening that is interior the fluid chamber at a location therein proximate to a bottom region of the fluid chamber.

8. The heating system of claim 1, the thermal mixing valve further comprising a thermal actuator, wherein the thermal actuator includes an expansion material that is selected from the group consisting of a wax, a shape memory alloy, and a MEMS thermal actuator, and combinations thereof.

9. The heating system of claim 8, the thermal mixing valve further comprising a housing that defines a mixing chamber and a mixing nozzle arranged within the mixing chamber, wherein the mixing nozzle includes a first side and a second side, the first side of the mixing nozzle being arranged proximate the fluid outlet of the thermal mixing valve, wherein the mixing nozzle further comprises a central bore that receives the thermal actuator and extends through the nozzle from the first side to the second side, the central bore having a first bore portion that is proximate to the first side and a second bore portion that is proximate to the second side, wherein the second bore portion has a diameter that is larger than a diameter of the first bore portion, and wherein the first side of the nozzle includes a plurality of flow channels that extend from the first side into the second bore portion.

10. The heating system of claim 9, wherein the nozzle further comprises a plurality of slots arranged along an edge of the second side.

11. A heating system, comprising:
a water heater having a tank defining a fluid chamber, and a valve chamber arranged on an upper end of the tank;
a heating element arranged within the fluid chamber, wherein the heating element includes an inlet and an outlet, wherein the outlet of the heating element is proximate to an upper region of the fluid chamber; and
a thermal mixing valve arranged within the valve chamber, wherein the thermal mixing valve includes a first and second fluid inlet that each extend into the fluid chamber and a fluid outlet, the second fluid inlet extending into the upper region of the fluid chamber that is above the outlet of the heating element, and the first fluid inlet extending below the second fluid inlet.

12. The heating system of claim 11, wherein the second fluid inlet of the thermal mixing valve includes an opening that is arranged above the outlet of the heating element by a distance of about two (2) to three (3) times a diameter of the fluid chamber.

13. The heating system of claim 11, wherein the tank includes an adaptor arranged at the upper end thereof, the adaptor configured to removably engage a cap.

14. The heating system of claim 11, wherein the first fluid inlet comprises a conduit that extends through the fluid chamber of the tank and terminates at an opening that is exterior the fluid chamber.

15. The heating system of claim 14, wherein the conduit further comprises a second opening that is interior the fluid chamber at a location therein proximate to a bottom region of the fluid chamber.

16. The heating system of claim 15, wherein the second opening of the conduit is proximate to the inlet of the heating element.

17. The heating system of claim 11, the thermal mixing valve further comprising a housing that defines a mixing chamber and a mixing nozzle arranged within the mixing chamber, wherein the mixing nozzle includes a first side and a second side, the first side of the mixing nozzle being arranged proximate the fluid outlet of the thermal mixing valve, wherein the mixing nozzle further comprises a central bore that receives a thermal actuator and extends through the nozzle from the first side to the second side, the central bore having a first bore portion that is proximate to the first side and a second bore portion that is proximate to the second side, wherein the second bore portion has a diameter that is larger a diameter of the first bore portion, and wherein the first side of the nozzle includes a plurality of flow channels that extend from the first side into the second bore portion.

\* \* \* \* \*